(12) United States Patent
Stevens et al.

(10) Patent No.: US 7,165,687 B1
(45) Date of Patent: Jan. 23, 2007

(54) STORAGE ORGANIZER

(76) Inventors: Gene M. Stevens, P.O. Box 232, Mt. Airy, MD (US) 21771; Joyselyn Stevens, P.O. Box 232, Mt. Airy, MD (US) 21771

( * ) Notice: Subject to any disclaimer, the term of this patent is extended or adjusted under 35 U.S.C. 154(b) by 0 days.

(21) Appl. No.: 10/292,559

(22) Filed: Nov. 12, 2002

Related U.S. Application Data

(63) Continuation of application No. 09/559,706, filed on Apr. 27, 2000, now abandoned.

(51) Int. Cl.
*A47F 5/00* (2006.01)
(52) U.S. Cl. .................. 211/86.01; 211/118; 211/72
(58) Field of Classification Search ............ 211/86.01, 211/26, 55, 10, 113, 118, 119.004, 72; 248/918, 248/690, 672, 205.2; 206/308.1, 308.3
See application file for complete search history.

(56) References Cited

U.S. PATENT DOCUMENTS

| | | | | |
|---|---|---|---|---|
| 2,061,302 A * | 11/1936 | Egler | ........................ | 297/188.18 |
| 2,720,189 A | 10/1955 | Newman | | |
| 2,979,098 A * | 4/1961 | Greaves | ........................ | 224/275 |
| 3,717,188 A * | 2/1973 | Green | ........................ | 224/42.11 |
| D258,098 S * | 2/1981 | Norinsky | ........................ | D3/231 |
| 4,339,061 A * | 7/1982 | Dunn | ........................ | 224/407 |
| 4,469,256 A * | 9/1984 | McEwen | ........................ | 224/413 |
| 4,580,706 A * | 4/1986 | Jackson et al. | ........................ | 224/427 |
| 4,651,872 A * | 3/1987 | Joyce | ........................ | 206/760 |
| 4,736,853 A * | 4/1988 | O'Mara | ........................ | 211/88.01 |
| 4,744,446 A | 5/1988 | Arney | | |
| D297,439 S | 8/1988 | Rabig | | |
| 4,767,093 A * | 8/1988 | Jones | ........................ | 248/442.2 |
| 4,773,535 A * | 9/1988 | Cook | ........................ | 206/373 |
| 4,796,790 A * | 1/1989 | Hamilton | ........................ | 224/675 |
| 4,842,032 A * | 6/1989 | Mastronardo | ........................ | 206/308.1 |
| 4,953,765 A * | 9/1990 | Little et al. | ........................ | 224/583 |
| 4,960,204 A * | 10/1990 | Young et al. | ........................ | 206/235 |
| D314,087 S * | 1/1991 | Macklin | ........................ | D3/303 |
| 5,002,401 A * | 3/1991 | Blackman | ........................ | 383/38 |
| 5,031,807 A * | 7/1991 | Tiffany | ........................ | 224/429 |
| 5,105,920 A * | 4/1992 | Grebenstein | ........................ | 190/18 A |
| D329,876 S | 9/1992 | Breen | | |
| 5,150,284 A * | 9/1992 | Dobert | ........................ | 362/485 |
| 5,160,001 A * | 11/1992 | Marceau | ........................ | 190/102 |
| 5,181,555 A * | 1/1993 | Chruniak | ........................ | 165/41 |
| 5,207,254 A * | 5/1993 | Fromm | ........................ | 150/104 |
| 5,370,246 A * | 12/1994 | Traynor | ........................ | 211/86.01 |
| 5,423,404 A * | 6/1995 | Shaw | ........................ | 190/102 |

(Continued)

*Primary Examiner*—Jennifer E. Novosad
(74) *Attorney, Agent, or Firm*—J. Bruce Hoofnagle

(57) ABSTRACT

One embodiment (100) of a storage organizer includes three panels (52), (94) and (102) which are structured for attachment by a hook and loop fastener (86) to exterior surfaces of a computer unit including a computer (84). Other panels (81), (105) and (380), and a top storage unit (106), are attached to exterior surfaces of respective ones of the panels (52), (94) and (102). The panels (81), (105) and (380), and the top storage unit (106), are structured to form various configurations of storage cells for storing accessories typically used in conjunction with the use of the computer (84). The panels (52), (81), (94), (102), (105) and (380) are composed of a panel material (54) which includes three layers (216), (218) and (220) of a non-metallic material which are bound together by an edge binder (226) sewn in place by a thread (228).

19 Claims, 11 Drawing Sheets

U.S. PATENT DOCUMENTS

| | | | | |
|---|---|---|---|---|
| 5,445,266 A | * | 8/1995 | Prete et al. | 206/320 |
| D364,989 S | | 12/1995 | Lin | |
| 5,526,924 A | * | 6/1996 | Klutznick | 206/5 |
| 5,573,288 A | * | 11/1996 | Raffensperger | 297/188.12 |
| 5,581,829 A | * | 12/1996 | Lee | 5/503.1 |
| 5,598,921 A | | 2/1997 | Hunt | |
| 5,638,915 A | * | 6/1997 | Hardy | 182/129 |
| 5,647,786 A | * | 7/1997 | Caspescha | 446/85 |
| 5,664,673 A | * | 9/1997 | Perry | 206/371 |
| 5,718,104 A | * | 2/1998 | Kennedy | 53/491 |
| 5,758,972 A | * | 6/1998 | Mack et al. | 5/503.1 |
| 5,775,497 A | * | 7/1998 | Krulik | 206/320 |
| 5,779,366 A | | 7/1998 | McKenzie, III et al. | |
| 5,818,635 A | * | 10/1998 | Hohn et al. | 359/612 |
| 5,918,711 A | * | 7/1999 | Godshaw | 190/107 |
| 5,938,012 A | * | 8/1999 | Yeager et al. | 206/205 |
| 5,971,148 A | * | 10/1999 | Jackson | 206/320 |
| 5,996,786 A | * | 12/1999 | McGrath | 206/308.1 |
| 6,149,001 A | * | 11/2000 | Akins | 206/320 |
| 6,398,023 B1 | * | 6/2002 | Williams | 206/308.1 |

* cited by examiner

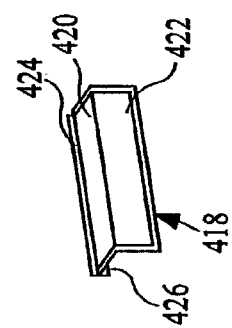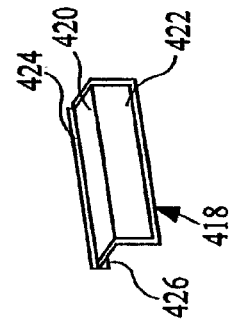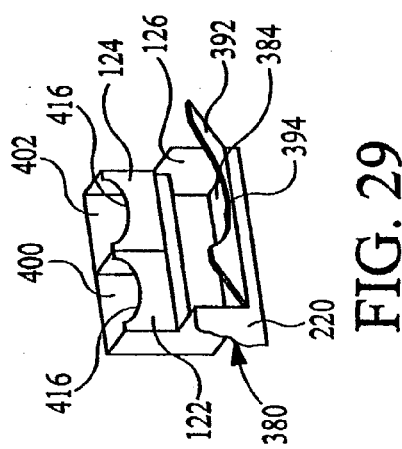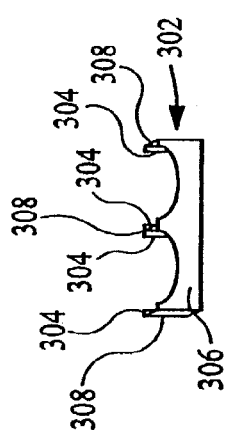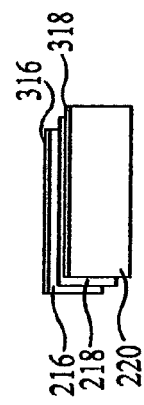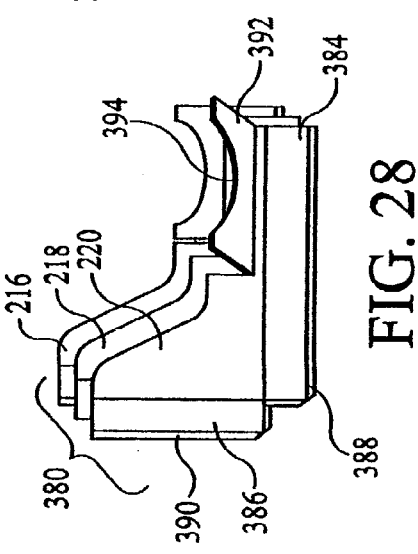

STORAGE ORGANIZER

This application is a continuation of applicants' U.S. application Ser. No. 09/559,706, filed on Apr. 27, 2000 now abandoned, and titled STORAGE ORGANIZER, which is pending. The disclosure of applicants' above-noted co-pending application is incorporated herein by reference thereto.

BACKGROUND OF THE INVENTION

This invention relates to a storage organizer, and particularly relates to a storage organizer associated with computers and computer peripherals, and having a plurality of compartments for storing a variety of computer-related accessories.

In recent years, the popularity and demand for personal computers has been increasing at a significantly high rate. Such demand stems from many segments of society including, for example, the workplace, schools and the home. This popularity, in effect, has resulted in the development of many accessories for use with the computer and the peripherals. Examples of such accessories include cables, plugs, diskettes, compact disks, optical disks, high-storage disks, manuals, documents, special mechanical tools, special cleaning products, writing instruments, stationery, paper clips, binder clips, and the like.

Various types of storage facilities are available to store, in an organized fashion, some of the above-noted accessories. Typically, however, each such facility provides storage for only a few of the accessories, and requires a dedicated space on a desk top or adjacent planar, and typically horizontal, surface. Where several such storage facilities are used to organize and store accessories, the desk top or area surrounding the computer and related peripherals becomes cluttered because of the demand for the dedicated spaces.

A workplace organizer for storing a few of the accessories is disclosed in U.S. Pat. No. 5,598,921, which issued on Feb. 4, 1997. The workplace organizer, which can be secured by screws to a keyboard shelf, is typically located slidably below a desk countertop, or to any nearby baseplane. The organizer includes sections for storage of diskettes, a pad of note paper, paper clips, business cards, pens and pencils. An organizer of this type requires a dedicated space for securance thereof to the keyboard shelf or desk countertop, while providing storage for a limited number of accessories.

A storage caddy for storing magnetic tape cassettes is disclosed in U.S. Pat. No. 3,717,188, which issued on Feb. 20, 1973. In particular, the storage caddy includes a plurality of pockets attached to a backing and arranged in a vertical stack. A bottom portion of each pocket, except for the lowermost pocket, is located within the top of an opening of the immediately subjacent pocket. One of the cassettes is placed into each pocket, with the top of the cassette being canted outward from the backing. A removable flap provides a cover for all of the stored cassettes, while removable straps can be used to connect a pair of such storage caddies for use as a saddle bag.

The storage caddy described in U.S. Pat. No. 3,717,188 does not provide facility for storing the various types of accessories noted above, and is not configured for locating the caddy in a confined space adjacent a computer or peripherals thereof.

Frequently, accessories are stored in cabinets or storage closets at locations spaced considerably from the site of the computer, the related peripherals and the operator thereof. An inefficient, time-consuming and thought-interrupting trip by the operator is required to retrieve such distant accessories.

While many operators of computers and peripherals use various types of the above-noted storage facilities, still others do not use any storage facilities, which results in a cluttered and inefficient environment adjacent the computer and the peripherals.

Thus, there is a serious need for a storage organizer which uses very little space, which provides organized storage for a wide range of accessories within a small area and which facilitates the locating of the accessories for efficient and ready access by the operator.

SUMMARY OF THE INVENTION

It is, therefore, an object of this invention to provide a storage organizer adjacent a computer unit, such as a computer or computer peripherals, while requiring a small amount of space.

Another object of this invention is to provide a storage organizer adjacent a computer unit, such as a computer or computer peripherals, which provides organized storage for a wide-range of accessories within a small space.

Still another object of this invention is to provide a storage organizer adjacent a computer unit, such as a computer or computer peripherals, which locates a large number of accessories for efficient and ready access by an operator of the computer.

With these and other objects in mind, this invention contemplates a storage organizer for use with a computer unit for storing a plurality of computer-related accessories, wherein the computer unit is formed with a side surface. The storage organizer includes a panel having a first major surface and a second major surface. A plurality of storage cells are formed on the first major surface of the panel for storing the computer-related accessories therein. The panel is formed in a configuration which facilitates the locating of the second surface of the panel adjacent the side surface of the computer unit.

This invention further contemplates a storage organizer for use with a computer unit for storing a plurality of computer-related accessories, wherein the computer unit is formed with a side surface and at least one other surface which is contiguous with the side surface. The storage organizer includes a first panel having a first major surface and a second major surface, with a mating edge along a side thereof. A plurality of storage cells are formed on the first major surface of the first panel for storing the computer-related accessories therein. The first panel is formed in a configuration adapted for placement adjacent the side surface of the computer unit. A second panel is formed with a mating edge along one side thereof which is joined with the mating edge of the first panel, and is formed in a configuration adapted for placement adjacent the one other surface of the computer unit which is contiguous with the first surface of the computer unit.

This invention also contemplates a storage organizer for use with a computer unit for storing a plurality of computer-related accessories, wherein the computer unit is formed with a first surface contiguous with a second surface which is also contiguous with a third surface. The first and third surfaces are spaced side surfaces of the computer unit which are coupled through the second surface. The storage organizer includes first, second and third panels, each of which has a first major surface and a second major surface. The first and second panels are joined along common mating edges thereof, and the second and third panels are joined along common mating edges thereof. The mating edges of the second panel are on opposite sides thereof. A plurality of storage cells are formed on the first major surface of at least the first panel for storing the computer-related accessories therein. The joined first, second and third panels are conformable relative to each other into a configuration which facilitates the locating of the second surfaces of the first, second and third panels over and adjacent the first, second and third surfaces, respectively, of the computer unit.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 26 is a perspective view showing a panel configured for assembly with the panel of FIG. 25 to form storage cells in accordance with certain principles of the invention;

FIGS. 27 and 28 are exploded perspective views showing the three layers of material of FIG. 13 in position to form panels, which can be assembled with the panel of FIG. 25 to form storage cells, all in accordance with certain principles of the invention;

FIG. 29 is a perspective view showing storage cells formed in a box-like configuration for assembly with, and securance to, a panel of the storage organizer of FIG. 5, in accordance with certain principles of the invention; and FIGS. 30 and 31 are perspective views showing the panel material of FIG. 13 formed as storage cell lids for assembly with the panel of FIG. 25 in accordance with certain principles of the invention.

DESCRIPTION OF THE PREFERRED EMBODIMENT

In the following description of a storage organizer, various terms will be used to collectively define certain items associated with computers. The term "computer unit" refers to computer-related facilities such as, for example, computers and computer peripherals, which include, but are not limited to, computers, monitors, speakers, printers, facsimile machines, scanners, copiers and the like. The term "computer accessories" includes, but is not limited to, diskettes, compact disks, optical disks, high-storage disks, back-up tapes, manuals, documents, cables, plugs, special mechanical tools, special cleaning products, writing instruments, stationery, paper clips, binder clips and the like.

Figure 1:
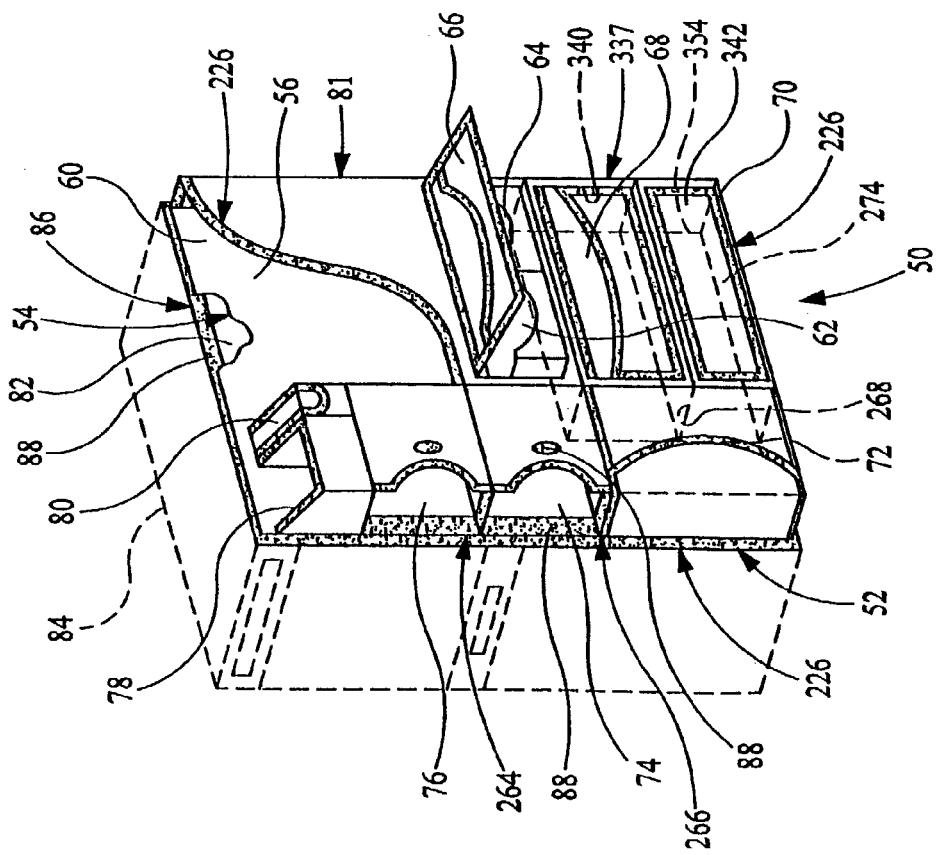
FIG. 1 is a perspective view showing a first embodiment of a systems organizer for in accordance with certain principles of the invention.
Figure 5:
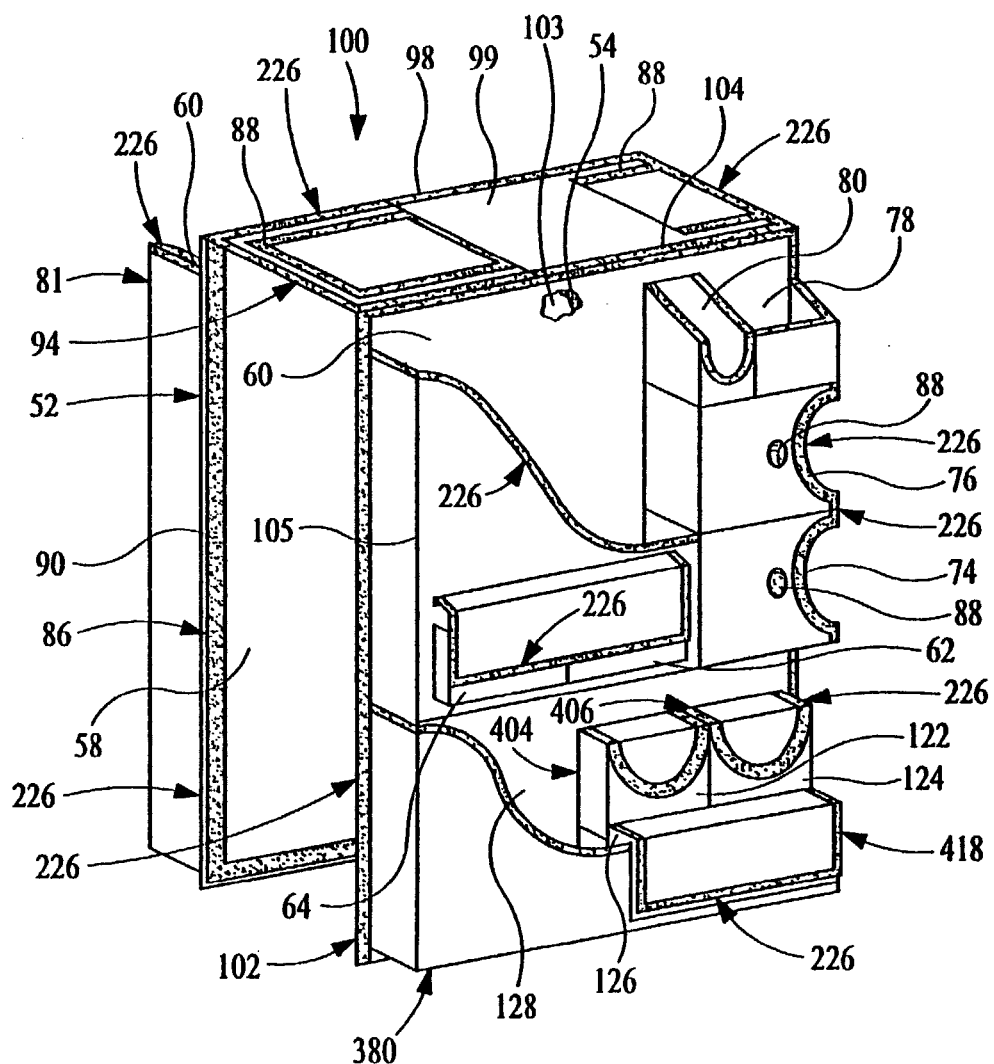
FIG. 5 is a perspective view of the third embodiment of the systems organizer of FIG. 3 showing additional structure in accordance with certain principles of the invention.

As shown in FIG. 1, a first embodiment 50 of the storage organizer includes a major, flat, left side panel 52 formed from a panel material 54 (FIG. 13), generally in a square or rectangular shape. The panel 52 is formed with a first major, or outboard, surface 56 and a second major, or inboard, surface 58 (FIG. 5). A plurality of storage cells, such as cells or bays 60, 62, 64, 66, 68, 70, 72, 74, 76, 78 and 80, are supported on, and have rear walls thereof formed by, the outboard surface 56 of the panel 52. Other walls of the cells or bays are formed by a pre-configured outboard panel 81 (FIG. 18), which is also composed of the panel material 54.

The panel 52 is formed generally in the shape and size of a major, flat, outboard side surface 82 of a computer unit such as, for example, a computer 84, which is shown in phantom. A two-part fabric fastener 86 such as, for example, a fabric hook and loop fastener, includes a first fastener strip 88 and a second fastener strip 90 (FIG. 5), which is used to attach the inboard surface 58 of the panel 52 to the outboard side surface 82 of the computer 84. The fastener strip 88 has an adhesive backing which is secured adhesively to a perimeter edge of the side surface 82 of the computer 84, and the fastener strip 90 has an adhesive backing which is secured adhesively to the inboard surface 58 of the panel 52. When the perimeter edge of the panel 52 is pressed against the perimeter edge of the outboard side surface 82 of the computer 84, the exterior hook and loop material of the two fastener strips 88 and 90 mesh together in a conventional manner to secure the panel in supporting fashion with the computer.

One type of fabric hook and loop fastener which could be used with the storage organizer is commercially available under the trademark "VELCRO." Other types of fasteners, such as threaded fasteners, snap fasteners, expandable locking fasteners, rivets or adhesive bonding materials, could be used in place of the fabric fastener 86 without departing from the spirit and scope of the invention.

The storage cells 60, 62, 64, 66, 68, 70, 72, 74, 76, 78 and 80 are each designed to receive and store specific computer accessories. For example, cell 60 could be used to store manuals and documents, each of the cells 62 and 64 could be used to store high-storage disks, cell 66 could be used to store envelopes, cells 68 and 70 could be used for storing miscellaneous items, cell 72 could be used to store a daily planner book, business cards, note pad and pens, cells 74 and 76 could be used to store compact disks, cell 78 could be used to store diskettes such as, for example, 3.5 inch disks, and cell 80 could be used to store miscellaneous items. The cells could be designed in many other configurations and dimensions, for storage of a variety of computer accessories without departing from the spirit and scope of the invention.

Figure 17:
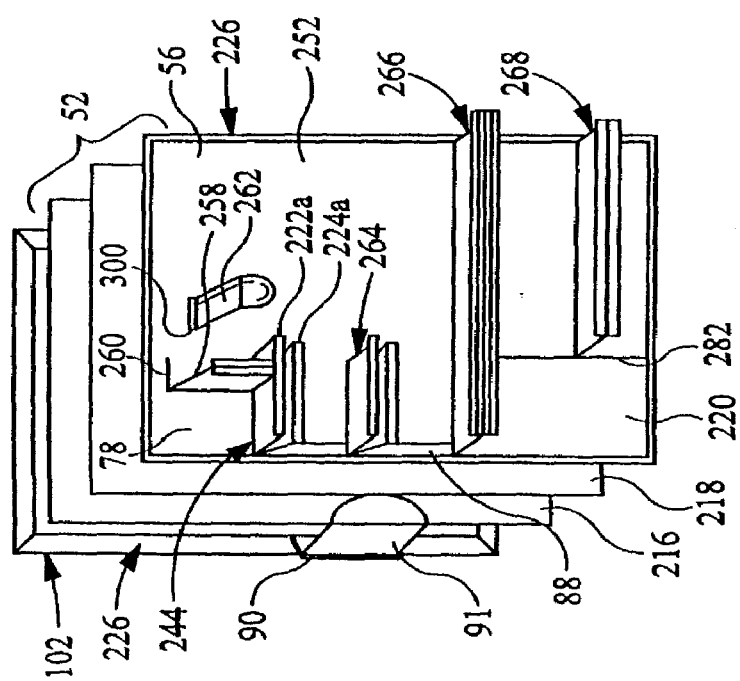
FIG. 17 is an exploded perspective view showing the three layers of material of FIG. 13 in position for assembly as a panel, with floor sections in assembly with at least one of the layers, in accordance with certain principles of the invention.

Each of the cells 74 and 76 is formed with a front opening with the fastener strip 88 being attached to an inside wall of the two cells. As shown in FIG. 17, a lid 91 is positioned for attachment to the fastener strip 90. Referring again to FIG. 1, the lid 91, with the fastener strip 90, can be assembled with the strip 88 which is attached to the inside wall, for example, of the cell 74 to serve as a lid for the cell. In similar fashion, a second lid, identical to the lid 91, can be assembled at the front opening of the cell 76. A small section of the fastener strip 88 is attached to an outer surface of each of the cells 74 and 76, and mates with a section of the fastener strip 90 (not shown), which is attached to an inside surface of the lid 91, to secure the lid in a cell-covering fashion.

As illustrated in FIG. 1, and as noted above, the panel 52 is flat and matches the flat mating side surface 82 of the computer 84. However, the panel 52 could be formed in configurations other than a flat configuration without departing from the spirit and scope of the invention, regardless of the configuration of the side surface 82 of the computer 84.

As illustrated in FIG. 1, the first embodiment 50 of the storage organizer hugs the side of the computer 84 and occupies a very small amount of space while, at the same time, providing a handy storage organizer for quick recovery of a large number of the stored computer accessories.

Figure 2:
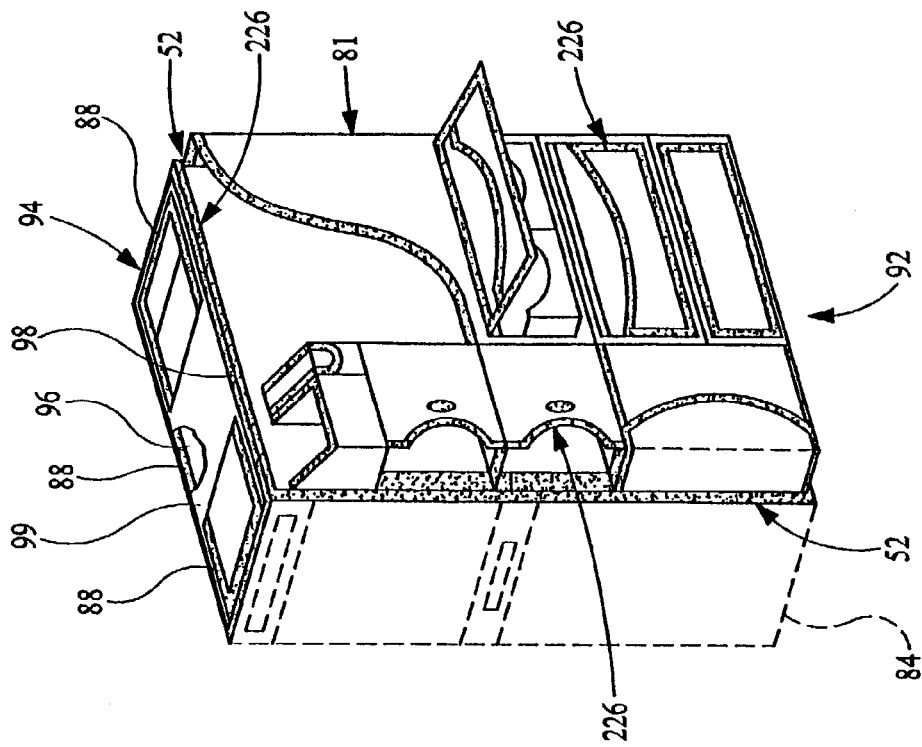
FIG. 2 is a perspective view showing a second embodiment of the systems organizer in accordance with certain principles of the invention.

Referring to FIG. 2, a second embodiment 92 of the storage organizer includes the side panel 52 attached to the outboard side surface 82 of the computer 84, and also includes a top panel 94, which is attached to a top surface 96 of the computer 84 in the same manner that the panel 52 is attached to the computer. The top panel 94 can be attached, for example by stitching, to the side panel 52 along adjoining edges 98 of the two panels, prior to assembly of the panels with the computer 84.

Thereafter, the joined panels 52 and 94 can be attached to the computer 84 by use of the hook and loop fastener 86 in the manner described above with respect to the attachment of the panel 52 to the side surface 82 of the computer in embodiment 50. As an alternative, the panels 52 and 94 can be attached individually to the computer 84 by use of the hook and loop fastener 86 as described above. The top panel 94 could be plain on a top surface 99 thereof, or could have attached thereto the strip 88 of the fastener 86 in selected patterns, in preparation for optional storage cells to be located on the top surface of the top panel.

Figure 3:
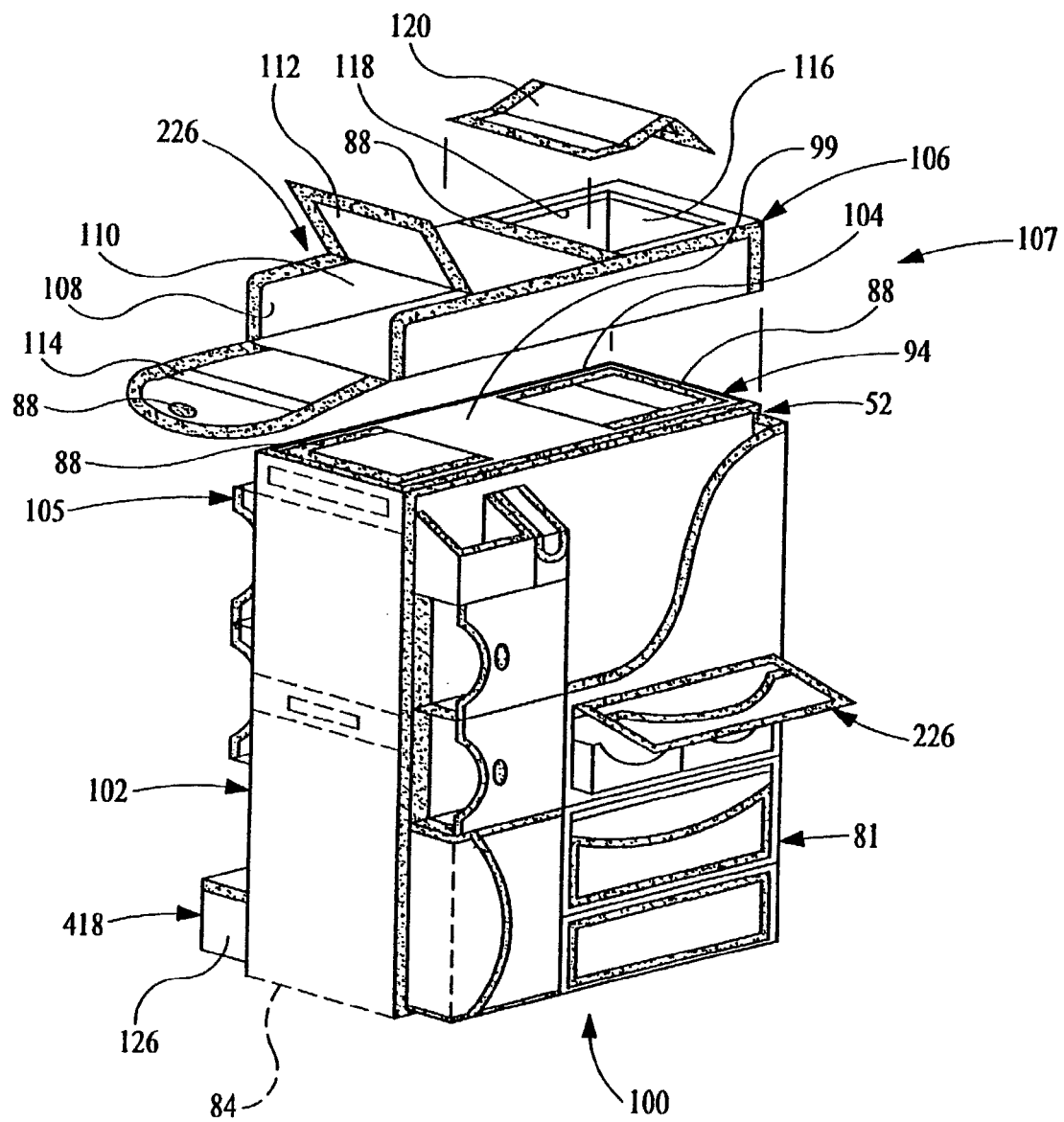
FIG. 3 is a perspective view showing a third embodiment, and a fourth embodiment, of the systems organizer, each in accordance with certain principles of the invention.
Figure 25:
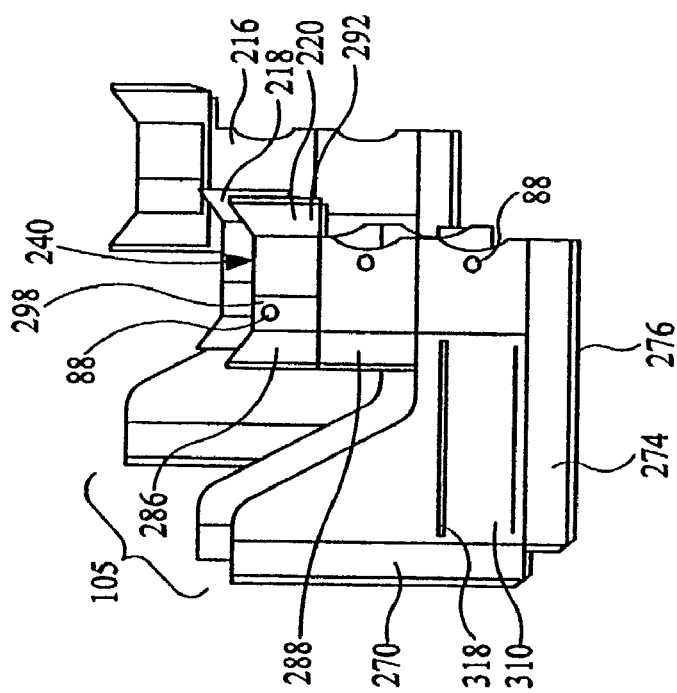
FIG. 25 is an exploded view showing the three layers of material of FIG. 13 in position for assembly to form a panel, which can be assembled with the panel of FIG. 24 to form storage cells, all in accordance with certain principles of the invention.

As shown in FIG. 3, a third embodiment 100 of the storage organizer includes a third or right side panel 102 which is similar to the panel 52 and includes a plurality of storage cells for storing computer accessories in the same manner as the storage cells of the panel 52. The storage cells which occupy an upper section of the panel 102 are generally formed by a panel 105 (FIG. 25), and are generally a mirror image of the upper section of the panel 81 (FIGS. 5 and 25). For this reason, it is to be understood that the numbering of the cells formed by the panel 105 will be the same as the corresponding numbering for the panel 81.

The top panel 94 can be attached, for example by stitching, to the side panel 102 along adjoining edges 104 of the two panels, prior to assembly of the panels with the computer 84. The side panel 102 is attached to a right side surface 103 (FIG. 5) by use of the fabric fastener 86.

A three-panel storage organizer is thereby formed, with the panels 52 and 94 joined along the adjoining edges 98, and the panels 94 and 102 joined along the adjoining edges 104. The three-panel storage organizer, including the joined panels 52, 94 and 102, can be attached to the computer 84 by use of the hook and loop fasteners 86 in the manner described above.

As an alternative, in the preferred embodiment, the panels 52, 94 and 102 can be attached individually to the computer 84, by use of the hook and loop fasteners 86 as described above, to form the three-panel storage organizer. Further, the panels 52 and 102 can be assembled with the mating side surfaces 82 and 103, respectively, of the computer 84, without the top panel 94, to form a two-panel storage organizer without departing from the spirit and scope of the invention.

In FIG. 3, the front, top and left side of the third embodiment 100 of the storage organizer is illustrated, with the organizer being located about the computer 84. In FIG. 5, the rear, top and right side of the third embodiment 100 of the storage organizer are illustrated, while the computer 84 is not illustrated to thereby reveal the inboard surface 58 of the panel 52 and the fastener strip 90. A plurality of storage cells or bays are supported on an upper section of the right side panel 102, which are essentially a mirror image of, and provide the same computer-accessories storage as, the cells 60, 62, 64, 66, 74, 76, 78 and 80 (FIG. 1).

Another plurality of storage cells or bays 122, 124, 126 and 128 are supported on a lower section of the right side panel 102 to store varied computer accessories. For example, the storage cells 122 and 124 could be used to store back-up tapes, the cell 126 could be used to store a tool kit and the cell 128 could be used to store small manuals.

Referring again to FIG. 3, a fourth embodiment 107 of the storage organizer is formed by attaching a top storage unit 106 to the top surface 99 of the top panel 94 by use of the hook and loop fasteners 86. In the fourth embodiment 107, the strips 88 of the hook and loop fastener 86 are attached to the top surface 99 of the top panel 94, and the strips 90 (not shown) are attached to the underside of the storage unit 106. As the storage unit 106 is placed on the top surface 99 of the top panel 94, the strips 88 and 90 blend in a hook and loop fashion to secure the storage unit with the top panel, to form the fourth embodiment 107 of the storage organizer.

The storage unit 106 is formed in a box-like configuration with a front opening 108 for a forward storage cell 110. An upper flap 112 is formed above a forward portion of the cell 110 to provide deep access to the cell, and a front lid 114 is attached to the cell adjacent the front opening 108. In use, computer accessories can be stored in the cell 110, whereafter the flap 112 is closed to a horizontal position and the lid is closed over the opening 108 and overlaps the top of the flap. A small section of the fastener strip 88 is attached to the inner surface of the lid 114, and mates with a section of the fastener strip 90 (not shown), which is attached to the top of the flap, to secure the flap and the lid in a cell-covering fashion.

The storage unit 106 is also formed with a rear storage cell 116, which has a top opening 118, and provides additional space for the storage of computer accessories. A rear lid 120 is attached to the top of the storage unit 106 by use of the fastener strip 88, on the top of the unit, and the fastener strip 90 (not shown) on the underside of the rear lid.

Figure 4:
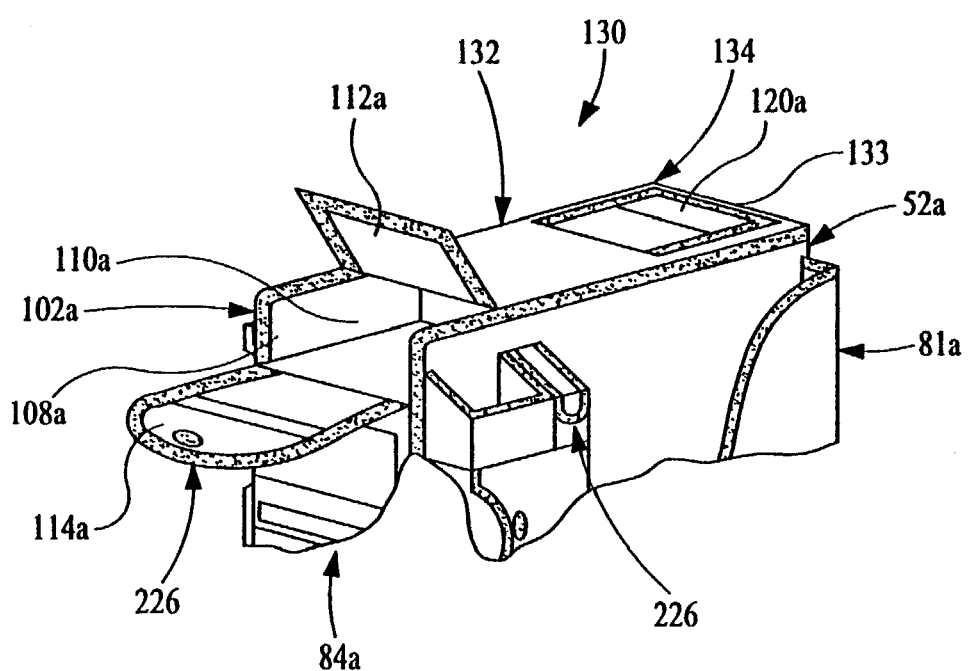
FIG. 4 is a partial perspective view showing a fourth embodiment of the systems organizer in accordance with certain principles of the invention.

Different brands and styles of computer units such as, for example, the computer 84 are commercially available with different height, width and depth dimensions. For example, the computer 84 has prescribed height, width and depth dimensions. Many other computer units such as, for example, a computer 84*a* as shown in FIG. 4, has height, width and depth dimensions which are different from the prescribed dimensions. In such instances where the dimensions are different, the individual panels 52, 94 and 102 can be manufactured to match the dimensions of the respective surfaces of the computer unit to which the individual panels will be attached, all without departing from the spirit and scope of the invention. For example, the individual panel 52 can be made to match the dimensions of the mating surface of either the computer 84 or the computer 84*a*, or any other computer unit of still different dimensions.

As further illustrated in FIG. 4, a fifth embodiment 130 of the storage organizer includes side panels 52*a* and 102*a* which extend above the top of the computer 84*a*, which has a height dimension less than the height dimension of the computer 84. A top panel 132 is joined along opposite side edges thereof to the upper edges of the panels 52*a* and 102*a*, and is formed structurally in the same manner as the top of the storage unit 106 (FIG. 3). The space between the top of the computer 84*a* and the top panel 132, and the extended portions of the side panels 52*a* and 102*a* with a linking rear panel section 133, form a storage unit 134 similar to the storage unit 106. The storage unit 134 includes a front opening 108*a* of a forward storage cell 110*a*, an upper flap 112*a*, a front lid 114*a* and a rear lid 120*a*, which covers a rear storage cell located forward of the linking rear panel section 133. The panels 52*a* and 102*a* support storage cells which are substantially the same as the cells supported on the panels 52 and 102, as shown in FIGS. 1 and 5, and as described above.

Figure 6:
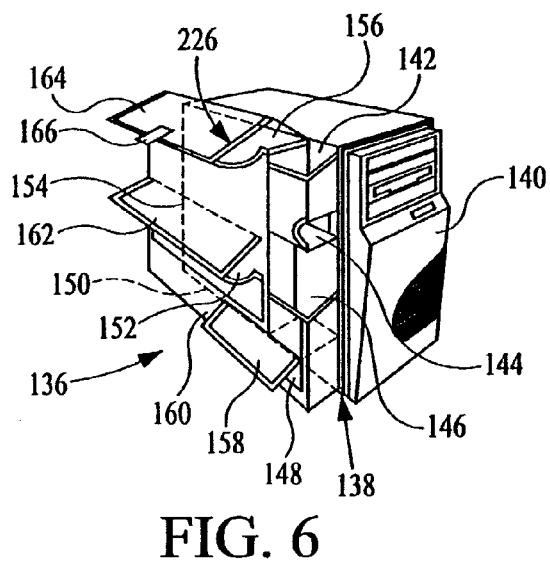
FIG. 6 is a perspective view showing a fifth embodiment of the systems organizer in accordance with certain principles of the invention.

A sixth embodiment 136 of the storage organizer is shown in FIG. 6, and includes a right side panel 138 which is attached to a side surface of a computer 140. A plurality of storage cells 142, 144, 146, 148, 150, 152, 154 and 156 are supported on the panel 138. Lids 158, 160, 162 and 164 are provided for cells 148, 150, 154 and 156, respectively. Lid 164 is formed with a securance tab 166 which facilitates securance of the tab by use of the hook and loop fastener 86.

Figure 7:
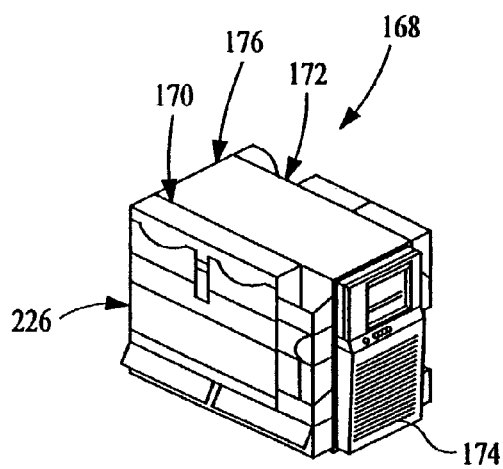
FIG. 7 is a perspective view showing a sixth embodiment of the systems organizer in accordance with certain principles of the invention.
Figure 8:
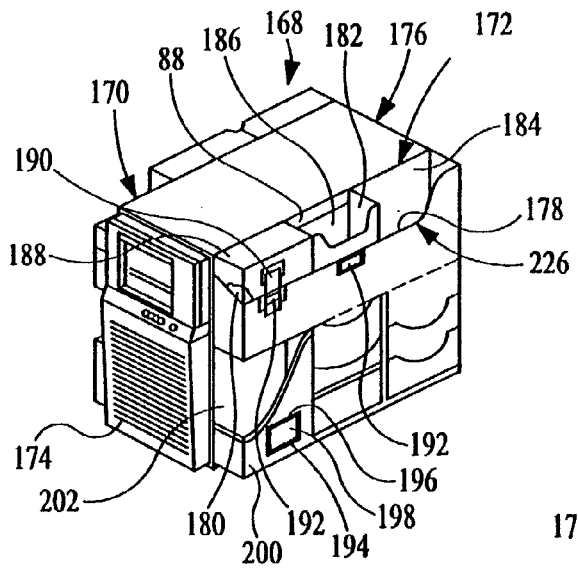
FIG. 8 is a perspective view showing a seventh embodiment of the systems organizer in accordance with certain principles of the invention.

A seventh embodiment 168 of the storage organizer is shown in FIGS. 7 and 8 and includes a right side panel 170 and a left side panel 172, which are attached to opposite right and left side surfaces of a computer 174 by use of the hook and loop fastener 86. The seventh embodiment 168 of the storage organizer could include a top panel 176 joined with top edges of the right and left panels 170 and 172, in the manner described above. A plurality of storage cells, which are substantially the same as the cells supported on the panel 138 (FIG. 6), are supported on the right side panel 170.

As shown in FIG. 8, another plurality of storage cells are supported on the left side panel 172, which include an upper trough 178 extending from the front of the panel to the rear thereof. A pair of box-like containers 180 and 182 are placed into the trough 178 at a forward position and a middle position, respectively, within the trough. A rear position of the trough 178 remains open to serve as a storage cell 184, which can be used to store manuals and the like.

Figure 9:
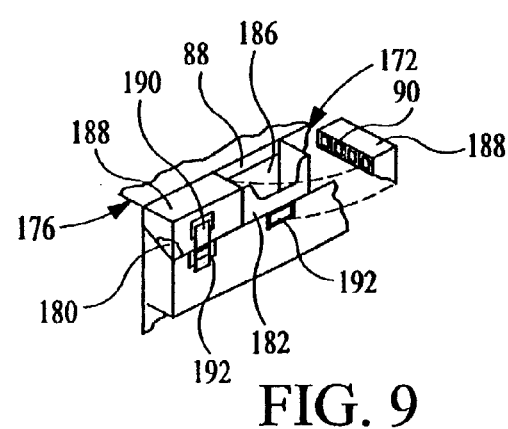
FIG. 9 is a perspective view of a portion of the seventh embodiment of the systems organizer of FIG. 8 showing additional features in accordance with certain principles of the invention.

Each of the containers 180 and 182 is formed with a top opening 186, which is covered by a box-like lid 188, and which serves as a storage cell for various types of disks or other miscellaneous computer accessories. A section of the fastener strip 88 is attached to an upper portion of an inboard wall of each of the containers 180 and 182. Referring to FIG. 9, a section of the fastener strip 90 is attached to a rear outer surface of each of the containers 180 and 182. When the lids 188 are placed over the open tops of the containers 180 and 182, the fastener strips 88 and 90 blend into engagement to fasten the lids to the respective containers.

Each of a pair of straps 190 (one shown) is attached to a front surface of a respective one of the lids 188, for example, by the fabric fastener 86 or by stitching. A pair of loops 192 are attached at spatial locations of a front wall surface of the trough 178, for example, by the fabric fastener 86 or by stitching, and are positioned to receive the straps 190 to further facilitate the securance of the lids 188 in assembly over the containers 180 and 182.

As shown in FIG. 8, a window 194 is formed by a square or rectangular frame 196 and a transparent cover 198. The frame 196 is attached, along upper and lower edges and one end edge, to an outer wall surface 200 of a storage cell 202 supported by the panel 172. The remaining end edge is open. Specific data such as, for example, model numbers, serial numbers and the like which relate to the computer unit such as, for example, the computer 174, is printed or typed onto a card which is slipped behind the cover 198, and forward of the surface 200. This provides the computer-related data in a ready form, which is easily accessible for viewing.

Figure 10:
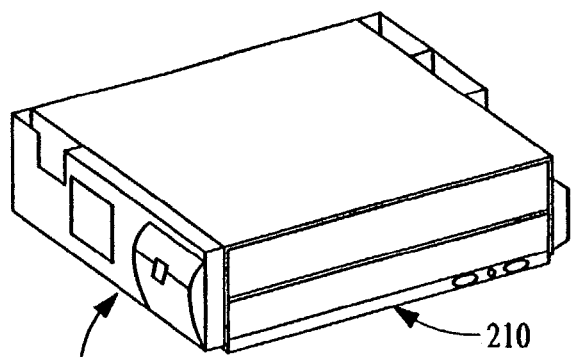
FIG. 10 is a perspective view showing an eighth embodiment of the systems organizer in accordance with certain principles of the invention.
Figure 11:
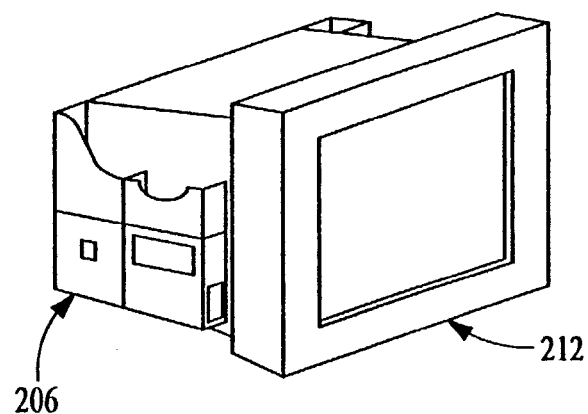
FIG. 11 is a perspective view showing an ninth embodiment of the systems organizer in accordance with certain principles of the invention.
Figure 12:
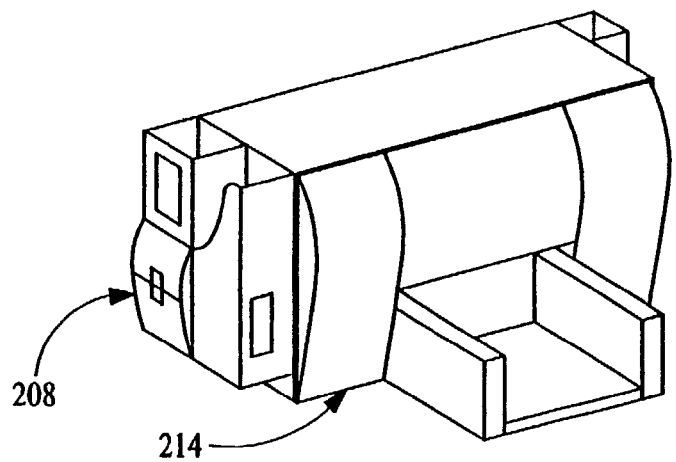
FIG. 12 is a perspective view showing a tenth embodiment of the systems organizer in accordance with certain principles of the invention.

An eighth embodiment 204, a ninth embodiment 206 and a tenth embodiment 208 of the storage organizer are shown in FIGS. 10, 11 and 12, respectively, which are assembled with computer units such as, for example, a desk-top computer 210, a monitor 212 and a printer 214, respectively. Other embodiments of the storage organizer could be assembled with other computer units such as, for example, speakers, facsimile machines, scanners, copiers and the like in similar fashion, without departing from the spirit and scope of the invention.

The storage cells or bays of the ten above-described embodiments of the storage organizer could be designed in many configurations and dimensions different from the configurations and dimensions illustrated in the drawings hereof and described above, without departing from the spirit and scope of the invention. Further, while the various panels of the ten embodiments of the storage organizer are shown and described as being flat, the above-described panels could assume other than flat configurations such as, for example, configurations which, in whole or in part, are curved, undulating, triangular, semi-conical or the like, without departing from the spirit and scope of the invention.

Various ones of the above-described ten embodiments of the storage organizer include one, two or three panels on which the storage cells are supported. Any embodiment of a storage organizer may include (1) only a single panel which is attached to the left side, the right side or the top of the computer unit, (2) only two panels which may be attached to any combination of two of the left side, the right side and the top of the computer unit, or (3) three panels which are assembled with the computer unit, all without departing from the spirit and scope of the invention.

The individual left side, right side and top panels, as described above, may be designed dimensionally to match the surfaces of the computer unit on which they are supported, or the panels can be dimensionally less than the surfaces of the computer unit on which they are supported, all without departing from the spirit and scope of the invention.

Figure 13:
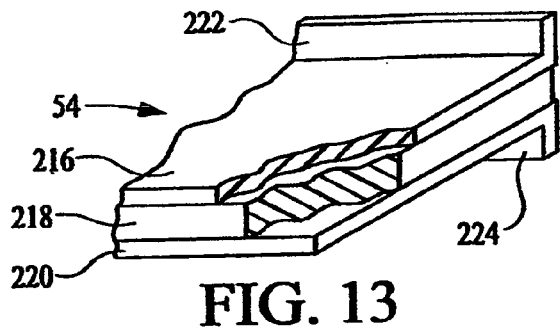
FIG. 13 is a perspective view showing a portion of three layers of material which form a panel material used in the first through the tenth embodiments of the systems organizer in accordance with certain principles of the invention.

As shown in FIG. 13, the panel material 54 is formed by three layers of material 216, 218 and 220. Each of the layers 216, 218 and 220 are formed from a non-metallic or plastic material, preferably nylon, but could be formed from other plastic materials such as, for example. Other materials could be used for the layers 216, 218 and 220 such as canvas or cardboard. In the formation of some sections of the panel material 54, an edge portion 222 extends from, and is folded out of the plane of, the layer 216, and edge portion 224 extends from, and is folded out of the plane of, the layer 220, both along a common edge of the panel material.

In the preferred embodiment of the panel material 54, the layers 216 and 220 form outer layers of the panel material at a prescribed thickness $t_1$, while the layer 218 forms a middle layer at a thickness $t_2$ which is greater than the prescribed thickness $t_1$. The panel material 54 could be formed with more or less than three layers of material without departing from the spirit and scope of the invention. Also, where the panel material 54 is composed of two or more layers of material, all layers could be the same thickness, or varying combinations of thickness differences, all without departing from the spirit and scope of the invention.

Figure 14:
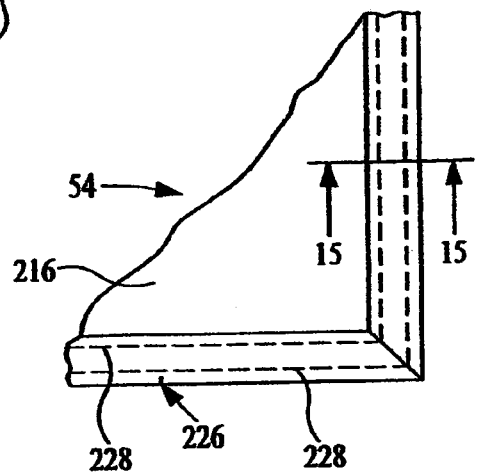
FIG. 14 is a partial view of a panel, formed from the panel material of FIG. 13, showing an edge binding assembled with outside edges of the panel in accordance with certain principles of the invention.

As shown in FIG. 14, selected common edges of the layers 216, 218 and 220 of the panel material 54 are covered with a decorative edge binder 226 which is sewn or stitched to, and through, the layers by a thread 228, to thereby join and maintain the layers 216, 218 and 220 in a unitized form from which the panels of the storage organizer are formed.

Figure 15:
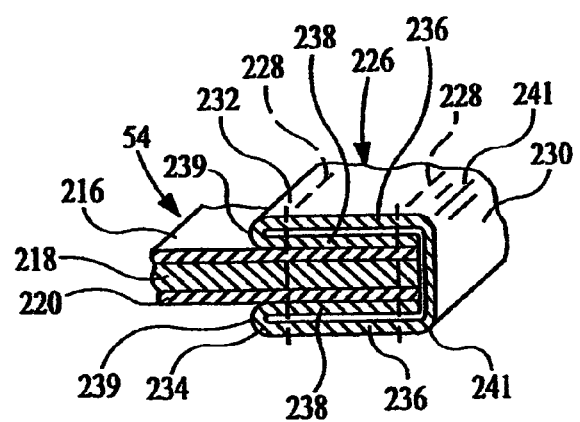
FIG. 15 is a sectional perspective view of a portion of the panel and edge binding of FIG. 14 showing an arrangement of assembling the binding with the panel in accordance with certain principles of the invention.

Referring to FIG. 15, the binder 226, which is also shown in FIGS. 1 through 8, is formed in a "U" shaped configuration which includes a single-thickness, web-like, base leg 230 and a pair of spaced double-thickness side legs 232 and 234, which are joined integrally with the base leg. Each of the side legs 232 and 234 is formed with an outer portion 236 and an inner portion 238, which is folded inside of and adjacent the outer portion. The selected edges of the panel material 54 is inserted in a space formed between the spaced inner portions 238 of the binder 226, and are located adjacent an inboard surface of the base leg 230. Thereafter, the panel material 54 and the binder 238 are secured together by use of the thread 228 in a stitching or sewing process. It is noted that rounded edges 239 are formed by folding the inner portions 238 to the inside of the outer portion 236 of each side leg 232 and 234, whereby the rounded edges 239 blend with rounded edges 241 at the junctures of each of the outer portions and the base leg 230.

Nylon is the preferable material for the binder 226 and for the thread 228. The binder 226 and the thread 228 could be formed from other non-metallic materials such as, for example, cotton, various polymers including polyurethane, and waxed threads without departing from the spirit and scope of the invention.

Figure 16:
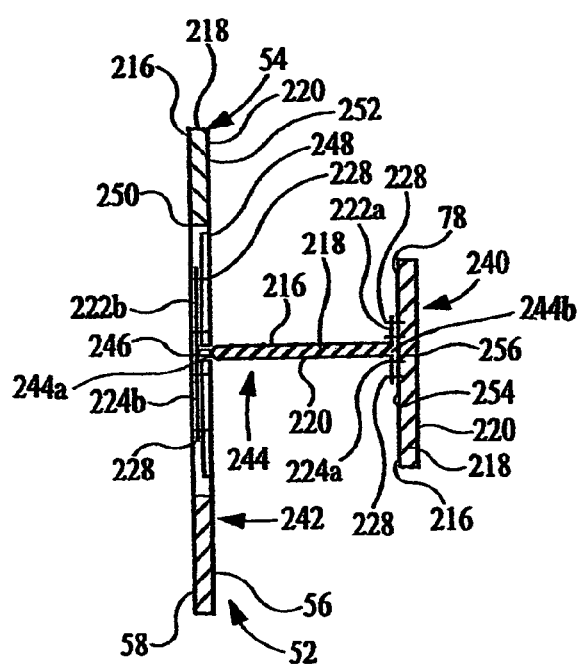
FIG. 16 is a sectional view showing an assembly of several of the panels of FIG. 14 to form walls and a floor of a storage cell in accordance with certain principles of the invention.

Referring to FIG. 16, a front wall, such as a front wall section 240, a rear wall 242 and a floor wall 244 of the storage cell 78 (FIGS. 1 and 16) can be formed by securing three sections of the panel material 54 in the manner illustrated. In particular, the floor wall 244 is formed from a section of the panel material 54 wherein the layer 216 of the floor wall is formed with edge portions 222a and 222b at opposite edges thereof, which are located at forward and rear edges, respectively, of the floor wall. Also, the layer 220 of the floor wall 244 is formed with edge portions 224a and 224b at opposite edges thereof, which are located at the forward and rear edges, respectively, of the floor wall.

Prior to assembly of the layers 216, 218 and 220, which form the panel 52 (FIGS. 1 and 16), a slot 246 is formed in the layer 220 and a backing layer 248, formed with a slot which is coincidental with the slot 246, is hot pressed to an inboard surface 250 of the layer 220 of the panel, and surrounds the slot 246 to provide bolster-like support for the portion of the layer 220 which surrounds the slot 246. The edge portions 222b and 224b of the floor wall 244 are then inserted through the slot 246, and the backing-layer slot, from a side of the layer 220 formed by an outboard surface 252 thereof. The edge portions 222b and 224b are folded away from each other so that they extend in opposite directions and are adjacent the backing layer 248 on opposite sides of the slot 246.

Thereafter, the thread 228 is used to attach and secure the edge portions 222b and 224b of the floor wall 244 to adjacent sections of the backing layer 248 and the layer 220 of the panel 52. The layer 218 of the panel 52 is then assembled over the inboard surface 250 of the layer 220 and covers an inboard side of the slot 246, and the backing-layer slot, the edge portions 222b and 224b of the floor wall 244, the backing layer 248 and the thread 228 which is visible on the edge portions. The layer 216 is then placed over the layer 218 to form the panel material 54 of the panel 52, and the edge binder 226 is placed over the assembled edges of the layers 216, 218 and 220 in the manner described above, and as illustrated in FIGS. 14 and 15. The thread 228 is then used to attach or sew the assembled binder 226 to the edges of the layers 216, 218 and 220 in the completion of the formation of the panel 52.

The above-described attachment of the edge portions 222b and 224b to the backing layer 248 and the layer 220, and the subsequent assembly of the layers 216 and 218 over the above-described attachment, is hereinafter referred to as "the internal attachment," and is the preferred form of internal attachment. Other forms of internal attachment, such as, for example, the use of adhesive bonding in lieu of the sewn threads 228, can be used without departing from the spirit and scope of the invention. Further, the internal attachment can be effected without the presence of the backing layer 248, without departing from the spirit and scope of the invention.

Referring again to FIG. 16, the edge portions 222*a* and 224*a* of the layers 216 and 220, respectively, are folded perpendicularly to the plane of the floor wall 244, with the edge portions extending away from each other. Prior to assembly of the layers 216, 218 and 220 in the formation of the front wall section 240, the folded edge portions 222*a* and 224*a* are placed in engagement with an outboard surface 254 of the layer 216, and are attached to the layer 216 by sewing the thread 228 through the folded edge portions and the layer 216. The layer 218 is then placed over an inboard surface 256 of the layer 216, and covers the threads 228 which are exposed on the inboard surface. The layer 220 is placed over the layer 218 to complete the formation of the panel material 54 for the front wall section 240, and the edge binder 226 is placed over the assembled edges of the layers 216, 218 and 220 in the manner described above, and as illustrated in FIGS. 14 and 15. The thread 228 is then used to attach or sew the assembled binder 226 to the edges of the layers 216, 218 and 220 in the completion of the formation of the front wall section 240.

The above-described attachment of the edge portions 222*a* and 224*a* to the outboard surface 254 of the layer 216 is hereinafter referred to as "the external attachment," and is the preferred form of external attachment in the formation of all of the above-described embodiments of the storage organizer. Other forms of external attachment, such as, for example, the use of adhesive bonding in lieu of the sewn threads 228, can be used without departing from the spirit and scope of the invention.

With the internal attachment and the external attachment having been effected with respect to the panel 52, the front wall section 240 and the floor wall 244, the floor wall assumes a perpendicular position between, and a firmly secured attachment with, the panel and the front wall section to form the cell 78. With this arrangement, the floor wall 244 is formed with an inboard end 244*a*, which is fastened to the rear wall 242, and an outboard end 244*b*, which is fastened to the front wall section 244.

Referring to FIG. 17, the three layers 216, 218 and 220 of the panel 52 (FIG. 1) are shown in an exploded view arrangement with an inboard surface of panel 102 (FIG. 5) shown in its spaced position behind the layer 216 of the panel. The floor wall 244 (FIG. 16) is shown in its position of assembly with layer 220 of panel 52 as described above, and by the internal attachment. An inboard side wall 258 of the cell 78, which is composed of the panel material 54, has one side edge secured to the layer 220 by the internal attachment, and a bottom edge secured to the floor wall 244 by the external attachment. A slot 260 is formed in the layer 220 for eventual receipt of an edge portion 300 of a lid 262 of the cell 80, formed by the panel material 54, and secured with the layer by the internal attachment. Other floor walls 264, 266 and 268 are illustrated in assembly with the layer 220 of the panel 52, and are secured therewith by the internal attachment. It is noted that a portion of the floor wall 266 forms a floor wall for the cell 60, while the remaining portion forms a floor wall for the cell 74 (FIG. 1).

Figure 18:
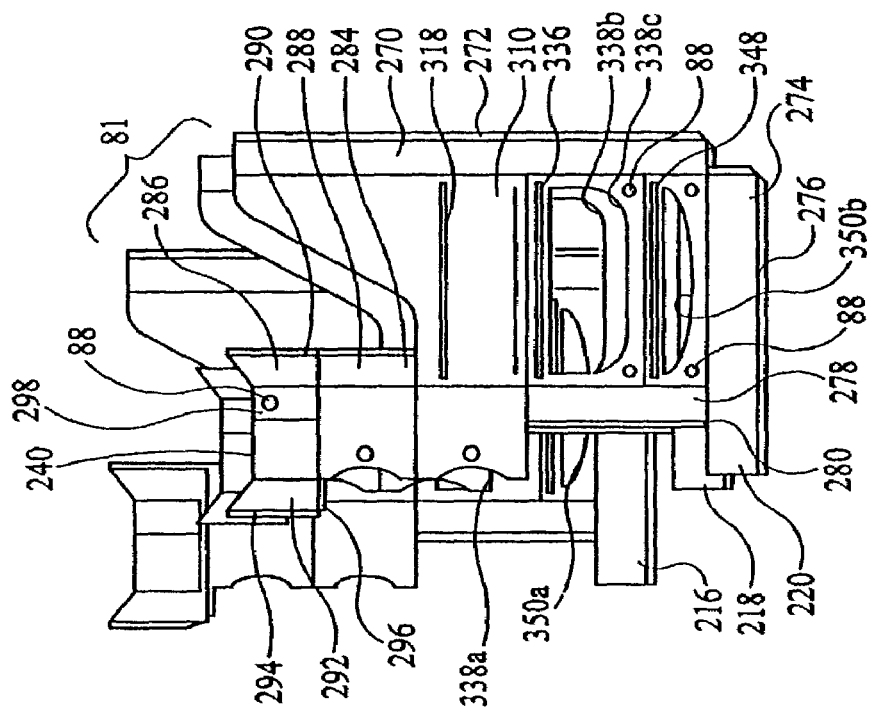
FIG. 18 is an exploded view showing the three layers of material of FIG. 13 in position for assembly to form a panel, which can be assembled with the panel of FIG. 17 to form storage cells, all in accordance with certain principles of the invention.

As shown in FIG. 18, the three layers 216, 218 and 220 of the outboard panel 81 are shown in an exploded view arrangement. Generally, the three layers 216, 218 and 220 of the panel 81 are pre-configured in the same manner, so that when the layers are assembled and joined by use of the binder 226 and the thread 228, the panel assumes an overall configuration as shown in FIG. 1. For that reason, where permissible, the layer 220 will be used to identify, by number, the various sections of the entire panel 81.

The panel 81 is formed with a side wall section 270 which extends along the entire right side of the panel as viewed in FIG. 18. The side section 270 is formed with an edge portion 272, which, after the section is folded, will be secured to the outboard surface 56 of the panel 52 by the external attachment. The panel 81 is further formed with a floor wall section 274 having an edge portion 276, which, after the floor wall section is folded, will be secured to the surface 56 of the panel 52 by the external attachment.

Another side wall section 278 is formed with an edge portion 280, which, after the section is folded, will be secured to the surface 56 of the panel 52 along an imaginary line 282 (FIG. 17) on the surface. An inboard side wall section 284 is formed with an upper segment 286 and a lower segment 288, and has an edge portion 290 extending along one side thereof. An outboard side wall section 292 is formed with edge portions 294 and 296, and front wall sections 240 and 298 extend between the side wall sections 284 and 292. After the wall sections 284 and 292 are folded, the edge portions 290, 294 and 296 are secured to the surface 56 by the external attachment.

Referring to FIG. 17, the side wall 258 and each of the floor walls 264, 266 and 266 are formed with edge portions identical to the edge portions 222*a* and 224*a*, all of which, including the edge portions 222*a* and 224*a*, are secured to respective locations of the inboard layer 216 of the panel 81 (FIG. 18) by the external attachment. The panel 81 is now assembled with, and secured to, the panel 52 with the various cells or bays being defined by the attachments described above.

Figure 19:
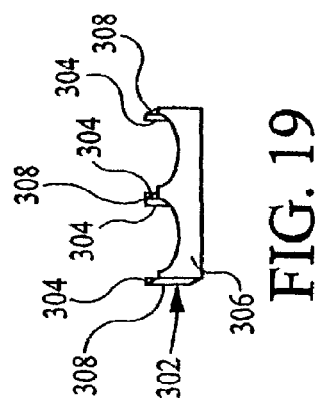
FIG. 19 is a perspective view showing a panel configured for assembly with the panel of FIG. 18 to form storage cells in accordance with certain principles of the invention.

Prior to the assembly of the three layers 216, 218 and 220 of the panel 81, and prior to the assembly of the panel 81 with the panel 52, the storage cells 62 and 64, as shown in FIG. 1, are formed by a double-compartment unit 302, shown in FIG. 19, which is composed of the panel material 54. The unit 302 includes edge portions 304, a front wall 306, three spaced side walls 308 and a floor wall (not shown). The edge portions 304 are secured to a surface 310 of the panel 81 by the external attachment.

Figure 20:
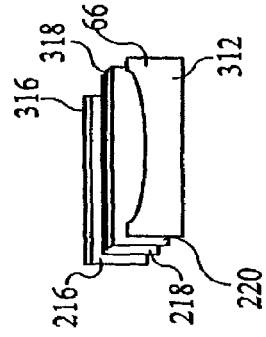

The cell 66 (FIG. 1) is formed by the panel material 54 with the three layers 216, 218 and 220, as shown in FIG. 20, and an additional front layer 312 of the same material as the layers 216, 218 and 220. The front layer 312 is secured to the three layers 216, 218 and 220, along the bottom and opposite sides thereof, by the binder 226 and thread 228. A top edge 314 of the layer 312 is formed in an arcuate shape and has the binder 226 attached thereto by the thread 228. The top edge 314 is not attached to the layers 216, 218 and 220 which provides an opening for the cell 66, between the layer 312 and the layer 220.

The layers 216 and 220 of the cell 66 are formed with edge portions 316 and 318 (FIG. 20), respectively, which are to be inserted into and through a slot 318 formed in the layer 220 (FIG. 18) of the panel 81 and secured therewith by the internal attachment. The cell 66 then provides a hinged cover over the cells 62 and 64 as illustrated in FIG. 1.

Figure 21:
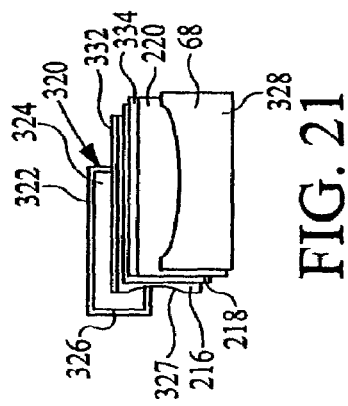

Referring to FIG. 21, the cell 68 (FIG. 1) is formed by the panel material 54 (FIG. 13) with the three layers 216, 218 and 220, as shown in FIG. 21, and an additional front layer 328 of the same material as the layers 216, 218 and 220. The front layer 328 is secured to the three layers 216, 218 and 220, along the bottom and opposite sides thereof, by the binder 226 and thread 228. A top edge 330 of the layer 328 is formed in an arcuate shape and has the binder 226 attached thereto by the thread 228. The top edge 328 is not attached to the layers 216, 218 and 220 which provides an opening for the cell 68, between the layer 328 and the layer 220.

Referring further to FIG. 21, a window 320 is formed by a square frame or rectangular frame 322, composed of the panel material 54, and a transparent cover 324. The frame 322 is attached, along upper and lower edges and one end edge, to an outer surface of the layer 216, which is not visible in FIG. 21. A remaining end edge 326, adjacent an arcuate edge 327 of the layer 216, is open. Specific data such as, for example, model numbers, serial numbers and the like which relate to the computer unit such as, for example, the computer 84, is printed or typed onto one side of a card (not shown). With the data on the card facing outward, the card is then slipped into an opening between the frame edge 326 and the arcuate edge 327, and into the space between the cover 324 and the adjacent surface of the layer 216. This provides the computer-related data in a ready form, which is easily accessible for viewing.

Referring still to FIG. 21. the layers 216 and 220 of the cell 68 are formed with edge portions 332 and 334, respectively, which are to be inserted into and through a slot 336 formed in the layer 220 (FIG. 18) of the panel 81 and secured therewith by the internal attachment. The assembled and secured layers 216, 218, 220 and 328 of cell 68 then provides a hinged cover 337 (FIG. 1) over aligned openings 338a, 338b and 338c formed through the layers 216, 218 and 220, respectively, of the panel 81 (FIG. 18). When the panel 81 is assembled with the panel 52 as described above, a storage cell 340 (FIG. 1) is formed behind the cover 337 and cell 68 (FIG. 1), which includes the floor section 268 (FIG. 18) as the floor wall thereof, and which is accessible through an opening formed by the aligned openings 338a, 338b and 338c formed in the panel 81.

As structured in the manner described above, the hinged cover 337 and the cell 68 function as (1) a storage location for the miscellaneous items within the cell as noted above, (2) a carrier of the window 320, which is visible when the hinged cover is raised to reveal the data on the card stored therein and (3) a cover for the storage cell 340 (FIG. 1).

Figure 22:
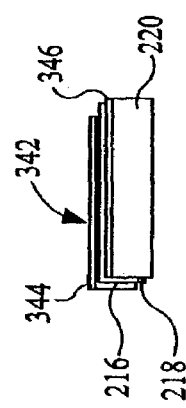

Referring to FIG. 22, a hinged cover 342 is composed of the three layers 216, 218 and 220 of the panel material 54 (FIG. 13) with the sheets 216 and 220 being formed with edge portions 344 and 346, respectively. After the layers 216 and 220 of the cover 342 have been assembled, and the edge binder 226 has been attached and secured to three edges of the layers, as shown in FIG. 1, by the thread 228, the edge portions 344 and 346 are inserted through a slot 348 formed through the layer 220 (FIG. 18) of the panel 81 and is secured in place by the internal attachment.

As shown in FIG. 18, the layers 216 and 220 of the panel 81 are formed with aligned openings 350a and 350b. Also, the layer 218 of the panel 81 is formed with an opening (not shown) which is identical to, and aligned with, the openings 350a and 350b. The three aligned openings, which include the openings 350a and 350b, form an access to a storage cell 354 (FIG. 1) which is covered by the hinged cover 342.

Figure 23:
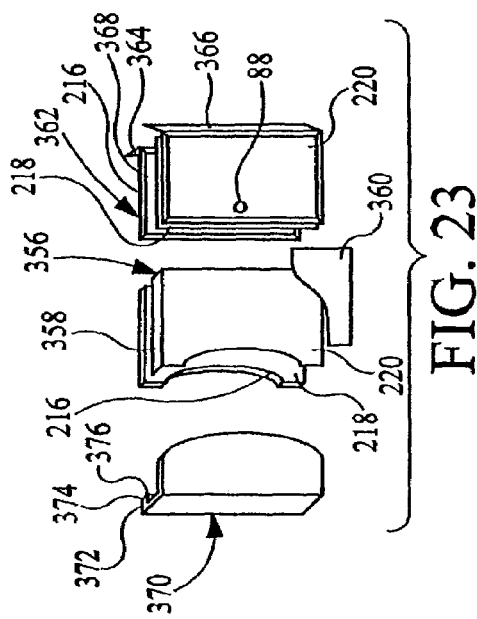
FIGS. 20, 21, 22 and 23 are exploded perspective views showing the layers of material of FIG. 13 in position and specifically configured to form panels which can be assembled with the panel of FIG. 18 to form storage cells and/or lids therefor in accordance with certain principles of the invention.

As shown in FIG. 23, the daily-planner storage cell 72 (FIG. 1) is formed with a separator wall 356 composed of the secured three layers 216, 218 and 220 of the panel material 54 (FIG. 13) with an edge portion 358 formed on, and extending from, the layer 220. A business card compartment is formed by a pre-shaped wall section 360, which is secured to a lower outside portion of the layer 220 of the wall 356. The wall edge portion 358, with the wall section 360, is attached to the layer 220 of the panel 52 adjacent the imaginary line 282 (FIG. 17).

A hinged cover 362 is composed of the three layers 216, 218 and 220 of the panel material 54 (FIG. 13) and includes edge portions 364 and 366 which are secured to the layer 220 of the panel 52 by the external attachment. A slot-like opening 368 is formed in the panel 216 of the cover 362 to provide a storage cell for receiving a note pad.

Another hinged cover 370 is composed of the three layers 216, 218 and 220 of the panel material 54, and is formed with edge portions 372 and 374 which are secured to the layer 220 of the panel 52. In addition, an elastic pen holder 376 is secured to an inside surface of the cover 368.

In use, the cover 362 is moved over the storage for the daily planner and the business cards, and the cover 370 is moved over the cover 362. The covers 362 and 370 are maintained in this position by use of the fabric fastener 86, with the first strip 88 thereof attached to an outer surface of the cover 362 and the second strip 90 (not shown in FIG. 23) being attached to an inner surface of the cover 370.

Figure 24:
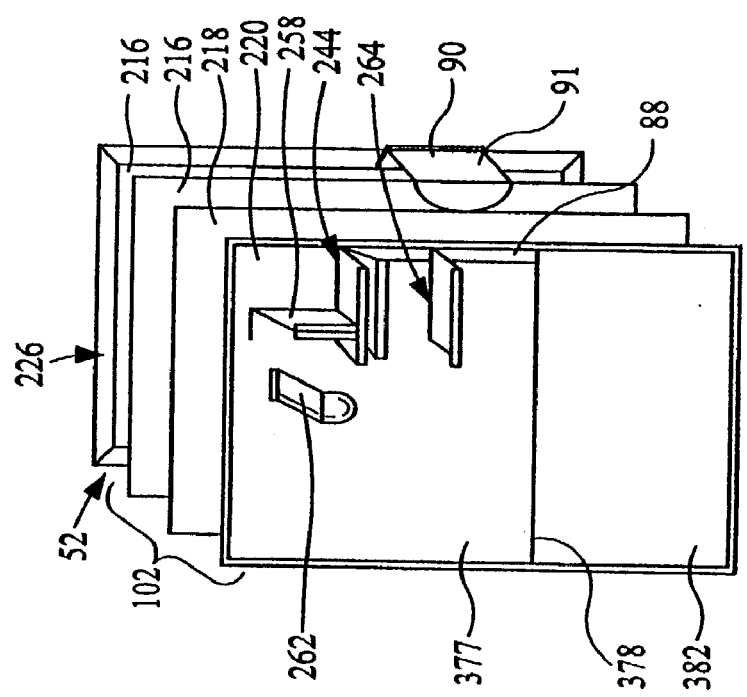
FIG. 24 is an exploded perspective view showing the three layers of material of FIG. 13 in position for assembly as a panel, with floor sections in assembly with at least one of the layers, in accordance with certain principles of the invention.

Referring to FIG. 24, the three layers 216, 218 and 220 of the panel 102 (FIG. 5) are shown in an exploded view arrangement with an inboard surface of panel 52 (FIG. 1) shown in its spaced position behind the layer 216 of the panel 102. The components which are pre-assembled with the layer 220 of the panel 102, on an upper surface section 377 and above an imaginary line 378 of the panel 102, are a mirror image of the corresponding components which are pre-assembled with the panel 52, as illustrated in FIG. 17. For this reason, the components in FIG. 24 will not be described herein, it being understood that the component numbering and the manner of pre-assembly of the components illustrated in FIG. 24 is the same as the corresponding components illustrated in FIG. 17.

Referring to FIG. 25, the three layers 216, 218 and 220 of the outboard panel 105 are shown in an exploded view arrangement and, when assembled, will be assembled with the upper surface section 377 of the panel 102. Generally, the three layers 216, 218 and 220 of the panel 103 are pre-configured in the same manner as the corresponding upper portion of the panel 81. For this reason, the various sections in FIG. 25 will not be described herein, it being understood that the section numbering illustrated in FIG. 25, and the description of the assembly of the panel 105 with the panel 102, are the same as the corresponding section numbering illustrated in FIG. 18, and the above description of the assembly of the panel 81 with the panel 52.

Referring to FIG. 5, the cells 62 and 64, which are assembled with the panel 105, are formed and assembled in the same manner as the cells 62 and 64 (FIG. 1) are formed and assembled with the panel 81. The structural features of the cells 62 and 64 of the panel 105, as shown in FIGS. 26 and 27, are identified by the same numbers used to identify the structural features of the cells 62 and 64 of the panel 81, as shown in FIGS. 19 and 20, except that the cells 62 and 64 of panel 105 do not include the front layer 312 or cell 66. Therefore, the manner of assembly of the cells 62 and 64 of the panel 105 is substantially the same as the above description regarding the assembly of the cells 62 and 64 of the panel 81.

The cells 126 and 128 (FIG. 5) are formed by an outboard panel 380, shown in FIG. 28 below the imaginary line 378, for attachment to a lower surface section 382 (FIG. 24) of the layer 220 of the panel 102. The panel 380 is composed of the layers 216, 218 and 220 of the panel material (FIG. 13) and includes a floor section 384 and a side wall section 386. The floor section 384 and the side wall section 386 of the layers 216 and 220 are formed with edge portions 388 and 390, respectively, and with hinged sections 392 having arcuate edges 394.

Referring to FIG. 29, the storage cells 122 and 124, which are also shown in FIG. 5, are formed in a box-like configuration with open tops 400 and 402, respectively. The cell units 122 and 124 are assembled on, and secured to, the lower surface section 382 of the panel 102 in the location shown in FIG. 5. The panel 380 (FIG. 28) is then assembled on, and secured to, the lower surface section 382 in the location shown in FIG. 5 by use of the external attachment.

As shown in FIG. 30, a pair of lids 404 and 406 are composed of the panel material 54 (FIG. 13) and are formed with edge portions 408 and 410, respectively. The lids 404 and 406 are each formed with a rectangular section 412 and a half-round section 414. The lids 404 and 406 are assembled, and secured with, the panel 102 as shown in FIG. 5 by the external attachment, and are hinged along the attachment. In use, the rectangular sections 412 of the lids 404 and 406 cover the open tops 400 and 402 of the cells 122 and 124, respectively, while the round sections 414 cover arcuate openings 416 formed in a front surface of the cells.

Referring to FIG. 31, a lid 418 is composed of the panel material 54 (FIG. 13) and is formed with an upper rectangular section 420 and a lower rectangular section 422. Edge portions 424 and 426 are formed along a free edge of the upper section 420 and facilitate a hinged securance of the lid 418 with the front face of the cells 122 and 124 by the external attachment. The upper section 420 of the lid 418 covers a top opening of the cell 126, while the lower section 422 of the lid covers substantially the hinged section 392 (FIG. 29). To access the cell 126, the lid 418 is raised in a hinged manner and the hinged section 392 is moved outward as illustrated in FIG. 29.

While the various attachments of the cell structures to the support panels such as, for example, panels 52 81, 102 and 105, are accomplished by the internal and external attachments as described above, all of the cells could be attached by the internal attachment or the external attachment without departing from the spirit and scope of the invention. Further, selected ones of the cells could be attached by one of the internal and external attachments and the remaining cells attached by the other of the internal and external attachments, in a pattern other than the pattern described above, all without departing from the spirit and scope of the invention.

In general, the above-identified embodiments are not to be construed as limiting the breadth of the present invention. Modifications, and other alternative constructions, will be apparent which are within the spirit and scope of the invention as defined in the appended claims.

What is claimed is:

1. A storage organizer for use with a computer unit for storing a plurality of computer-related accessories, wherein the computer unit is formed with a surface, which comprises:
    a panel having an inboard major surface and an outboard major surface on opposite sides thereof;
    a plurality of storage cells formed on the outboard major surface of the panel for storing the computer-related accessories therein;
    means formed on the inboard major surface of the panel for facilitating attachment of the inboard major surface to the surface of the computer unit; and
    at least one of the plurality of storage cells comprising:
        a front wall spaced outward from, and formed independently of, the panel;
        a rear wall formed by a portion of the panel spaced inward from the front wall;
        a floor wall formed, separately and independently of the panel and the front wall, with an inboard end and an outboard end, and extending between the front wall and the rear wall;
        means for fastening the inboard end of the floor wall to the rear wall; and
        means for fastening the outboard end of the floor wall to the front wall.

2. The storage organizer as set forth in claim 1, which further comprises:
    the means for facilitating includes a fastener attached to the panel to provide facility for attaching the panel to the side surface of the computer unit for support of the panel.

3. The storage organizer as set forth in claim 2, which further comprises:
    the fastener is a fabric hook and loop fastener.

4. The storage organizer as set forth in claim 1, wherein the panel is formed in a prescribed configuration to facilitate placement of the inboard major surface of the panel adjacent the side surface of the computer unit.

5. The storage organizer as set forth in claim 1, wherein the panel comprises:
    a first layer of material of a prescribed thickness, and having a surface formed in a prescribed planar format;
    a second layer of material of a thickness greater than the prescribed thickness, and having a surface formed in the prescribed planar format;
    the surfaces of the first and second layers of material being placed in interfacing engagement and joined in the prescribed planar format; and
    the prescribed planar format being the same for the surfaces of the first and second layers of material.

6. The storage organizer as set forth in claim 5, which further comprises:
    a third layer of material of a thickness less than the thickness of the second layer formed in the prescribed planar format;
    the second layer being formed with a first major surface and a second major surface;
    the first layer of material overlapping the first major surface of the second layer of material in the prescribed planar format;
    the third layer of material overlapping the second major surface of the second layer of material in the prescribed planar format; and
    the first, second and third layers of material being secured together.

7. The storage organizer as set forth in claim 6, wherein the material of the first, second and third layers of material is plastic.

8. The storage organizer as set forth in claim 6, wherein the first, second and third layers are secured together by a stitched plastic thread.

9. The storage organizer as set forth in claim 1, which further comprises:
    the front wall is parallel with the rear wall; and
    the floor wall is perpendicular with the front wall and the rear wall.

10. The storage organizer as set forth in claim 1, wherein the rear wall comprises:
    a first layer of material; and
    a second layer of material; and wherein the storage organizer further comprises:
a portion of the inboard end of the floor wall being located between the first layer and the second layer of the rear wall.

11. The storage organizer as set forth in claim 10, wherein the floor wall comprises:
a first layer of material;
a second layer material;
a third layer of material;
the second layer of material being in assembly with, and between, the first layer and the third layer;
extended sections of the first layer and the third layer of the floor wall extending from assembly with the second layer thereof in a direction away from the front wall at the inboard end of the floor wall; and
the extended sections of the first layer and the third layer forming the portion of the inboard end of the floor wall which is located between the first layer and the second layer of the rear wall.

12. The storage organizer as set forth in claim 10, wherein the means for fastening the inboard end of the floor wall to the rear wall comprises:
a thread extending through at least the first layer and the portion of the inboard end of the floor wall for securing together the first layer and the portion.

13. The storage organizer as set forth in claim 1, wherein the rear wall comprises:
a first layer of material formed with a first face which is facing away from the front wall, and a second face which is facing toward the front wall,
a second layer of material formed with a face which is facing toward the front wall and is in interfacing assembly with the first face of the first layer of material; and
a backing layer of material in interfacing engagement with a portion of the first face of the first layer of material adjacent the inboard end of the floor wall.

14. The storage organizer as set forth in claim 13, which further comprises:
the first layer of material formed with a first-layer slot extending therethrough adjacent the inboard end of the floor wall;
the backing layer formed with a backing-layer slot extending therethrough, and aligned with the first-layer slot; and
the portion of the inboard end of the floor wall extending through the aligned first-layer slot and the backing-layer slot.

15. The storage organizer as set forth in claim 13, wherein the face of the second layer is a first face, and which further comprises:
the second layer of material formed with a second face facing away from the floor wall; and
a third layer of material formed with a face which is in interfacing assembly with the second face of the second layer.

16. The storage organizer, as set forth in claim 1, for use with the computer unit wherein the surface is a first side surface, and the computer further includes a second side surface spaced from the first side surface, and a top surface extending between the first and second side surfaces, which further comprises:
the panel is a first side panel formed with the inboard major surface and the outboard major surface, with the inboard major surface being positionable adjacent the first side surface of the computer unit;
a second side panel formed independently of the first side panel and having an inboard major surface and an outboard major surface, with the inboard major surface being positionable adjacent the second side surface of the computer unit;
a top panel formed independently of the first side panel and the second side panel and having the inboard major surface and an outboard major surface, with the inboard major surface being positionable adjacent the top surface of the computer unit;
the first side panel being attached to the top panel along adjoining edges thereof,
means formed on the respective inboard major surfaces of the first side panel, the second side panel, and the top panel, for facilitating attachment of the respective inboard major surfaces to the first side surface, the second side surface, and the top surface, respectively, of the computer unit;
at least one of the first side panel, the second side panel and the top panel formed with the plurality of storage cells on the respective outboard major surface thereof; and
at least one of the plurality of storage cells comprising:
the front wall spaced outward from, and formed independently of, a respective one of the first side panel, the second side panel, and the top panel;
the rear wall, formed by a portion of the respective one of the first side panel, the second side panel, and the top panel, spaced inward from the front wall;
the floor wall formed, separately and independently of the front wall, and the respective on of the first side panel, the second side panel, and the top panel, with the floor wall formed with an inboard end and an outboard end, and extending between the front wall and rear wall;
means for fastening the inboard end of the floor wall to the rear wall; and
means for fastening the outboard end of the floor to the front wall.

17. The storage organizer as set forth in claim 16, which further comprises:
a fastener attached to the first side panel, the second side panel and the top panel to provide facility for attachment thereof to the first side surface, the second side surface and the top surface, respectively, of the computer unit.

18. The storage organizer as set forth in claim 17, which further comprises:
the fastener is a fabric hook and loop fastener.

19. The storage organizer as set forth in claim 17, which further comprises:
a fastener attachable to the inboard surface of at least one of the first side surface, the second side surface and the top surface of the computer unit for facilitating attachment thereof to at least one of the first side panel, the second side panel and the top panel, respectively, to provide facility for attachment thereof to the adjacent inboard surface.

\* \* \* \* \*